Jan. 25, 1927.

O. H. ESCHHOLZ 1,615,686

METHOD OF WELDING

Filed Sept. 28, 1921

WITNESSES:
H. B. Funk
W. B. Jaspert

INVENTOR
Otto H. Eschholz
BY
ATTORNEY

Patented Jan. 25, 1927.

1,615,686

UNITED STATES PATENT OFFICE.

OTTO H. ESCHHOLZ, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF WELDING.

Application filed September 28, 1921. Serial No. 503,855.

My invention relates to electric arc welding, more especially to a method of forming arc deposits for welds and joints.

It is among the objects of this invention to provide a method of forming electric arc deposits which may be applied to numerous forms of weld construction, which shall be simple to produce, which shall provide mechanically strong and efficient structures and joints, and which may be applied to lap and butt welds in a new and useful manner.

It is another object of this invention to provide a method of welding objects that are not in direct communication or contact with the welding arc.

It is a further object of my invention to provide a fusible electrode for arc welding which has exceptional penetrating powers in forming arc deposits on and into objects to be welded.

In practising my invention, I provide a fusible metal electrode of high penetrating qualities, by coating an ordinary steel electrode with a fluxing material. I have found that a coated alloy steel electrode, preferably nickel steel having a nickel content of about 3½%, has better penetrating qualities than the ordinary low-carbon steel electrode.

I place the electrode in suitable relation to the work or article to be welded in the usual manner and establish an electric arc therebetween. The coating flux tends to concentrate the heat of the arc to cause it to cut or penetrate into the work owing, presumably, to the greater concentration of the positive crater formed within the coating of the electrode. The metal of the article in contact with the arc is melted and displaced by the deposition of the electrode metal, the displaced metal forming a projecting layer underneath the weld. Skillful manipulation of the electrode is required to prevent the displaced metal from dropping off the base metal. This phenomenon of metal displacement may be employed in various useful weld structures or joints, such as for lap or butt welding, as will be hereinafter set forth.

In the accompanying drawings constituting a part hereof and in which like reference characters designate like parts, Fig. 1 is a perspective view of a weld being formed in accordance with my invention;

Figure 1:
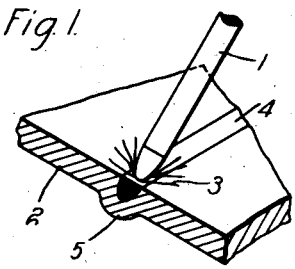
Figure 2:
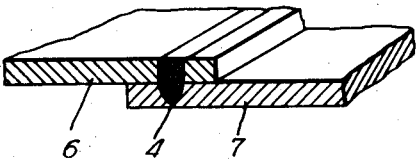
Figs. 2, 3 and 4 are cross-sectional views of various lap-welded plates having one or more deposits formed thereon.

As shown in Fig. 1, I provide an electrode 1 of suitable metal, preferably nickel steel, having substantially a 3½% nickel content, and, to increase the penetrating qualities thereof, I further coat the electrode with a suitable fluxing material, such as calcium oxide, sodium chloride, or a mixture of the two, or any other suitable fluxing agent. I place the electrode 1 in a suitable position relative to the plate 2, connect the electrode and plate to a suitable welding-current circuit (not shown) and an electric arc 3 is established therebetween. Owing to the concentration of the heat produced by such an electrode, the plate metal is melted, and is displaced by the arc deposit. The displaced metal forms a ridge or bead 5 underneath the plate and, if the process were continued, it would drop off. This action of the fused metal may be utilized advantageously in forming various welds as follows:

As shown in Fig. 2, the overlapped plates 6 and 7 may be joined by a weld consisting of an arc deposit 4 formed by manipulating the electrode along the surface of the plate 6 to cause the metal to be fused and displaced to a depth nearly through the plate 7.

Figure 3:
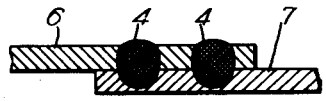
Figure 4:
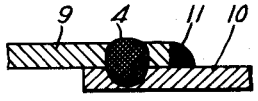

A lap weld may be formed by applying two deposits of this kind (Fig. 3) to produce a joint, the strength of which is proportional to the area of the welded surface. The lapped plates 9 and 10 (Fig. 4) may be first welded in the usual manner by depositing metal 11 along the edge or fillet of the plate 9 and then forming a penetrating deposit 4 through the plate members 9 and 10. The edge of the plate member 10 will not require welding, as was customary in previous lap welds, because of the bond provided by the penetrating deposit 4.

Figure 5:
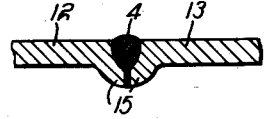
Fig. 5 is a cross-sectional view of buttwelded plates.

As shown in Fig. 5, plates 12 and 13 are placed with their edges abutting and an arc is established at the joint causing a fusion of the edges of the plates, the metal of which is displaced by the arc deposit 4, the displaced metal forming an inverted ridge 15 centrally of the seam or joint formed by the plates, thereby providing a reinforcement of the weld.

Figure 6:
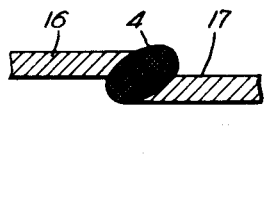
Fig. 6 is a cross-sectional view of lapwelded plates having a single arc-metal deposit formed along the overlapping edges.

Fig. 6 shows a lap weld in which the metal is deposited on the edge of the plate 16 and, owing to the penetration of the heat of the arc, a deposit is formed by displacement on the underside of the plate 16 and along the edge of the plate 17, thereby forming two fillets by one welding operation.

Figure 7:
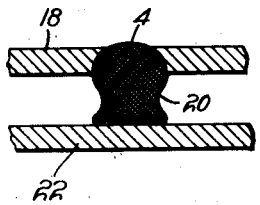
Figs. 7 and 8 are cross-sectional views of welds formed by confining the molten metal of the welded plates by a mold or backing plate.
Figure 8:
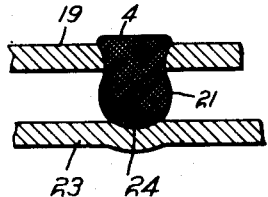

As shown in Figs. 7 and 8, a weld is formed on the plate members 18 and 19 by metal which penetrates the plates and forms an inverted ridge 20 and 21 underneath. This inverted ridge or bead comprises the base metal displaced by the electrode deposit and may be formed into various shapes, as by a straight backing plate 22 or by a mold 23 having a desired contour 24.

It will be seen from the above description of my invention that this method provides a simple and useful form of arc welding which may be applied to eliminate overhead welding and welding in difficult positions, such as the welding of tanks, boilers, ships and the like.

Although I have described a specific embodiment of my invention, it will be obvious to those skilled in the art that various modifications may be made in the form and structure of welds made in accordance therewith and in the type and composition of the electrodes and the coating flux used.

I claim as my invention:

1. A method of forming welds which comprises providing a fusible electrode, establishing an arc between said electrode and the metal to be welded, directing the heat of said arc to cause penetration thereof into the weld to melt said metal and replacing said molten metal with the metal deposited from said electrode.

2. The method of welding two overlapping metallic plates, one of which is relatively inaccessible, which consists in applying a cutting arc to the accessible plate in such manner as to cause the metal on the back side of said accessible plate to be softened and protruded into welding engagement with the underlying portion of the inaccessible plate.

3. The method of welding two metallic plates, which consists in applying a cutting arc thereto, which raises the metal near the back side of at least one of said plates to a welding temperature whereby it becomes welded to the metal of the other plate, and filling the depression caused by said cutting arc with arc-deposited metal.

4. The method of reaching relatively inaccessible portions of two metallic plates to be welded, which consists in treating the accessible side of the desired joint with an electric arc drawn from a metallic electrode of such nature that the metal near the back side of at least one of said plates is raised to a welding temperature whereby it becomes welded to the metal of the other plate, and the depression caused by the cutting effect of the arc is simultaneously filled with arc-deposited metal from said electrode.

5. An arc-welded joint comprising a plurality of parent metal structures and a zone of arc-fused metal extending through one of said structures into a second structure, said zone comprising fused parent metal and arc-deposited metal.

In testimony whereof, I have hereunto subscribed my name this 21st day of September, 1921.

OTTO H. ESCHHOLZ.